US008833040B2

(12) United States Patent
Van Walraven et al.

(10) Patent No.: US 8,833,040 B2
(45) Date of Patent: Sep. 16, 2014

(54) PROFILE ELEMENT

(75) Inventors: Jan Van Walraven, Mijdrecht (NL);
Marek Juzak, Mijdrecht (NL)

(73) Assignee: J. Van Walraven Holdings B.V.,
Mijdrecht (NL)

( * ) Notice: Subject to any disclaimer, the term of this patent is extended or adjusted under 35 U.S.C. 154(b) by 0 days.

(21) Appl. No.: 13/697,370

(22) PCT Filed: May 19, 2010

(86) PCT No.: PCT/NL2010/000086
§ 371 (c)(1),
(2), (4) Date: Nov. 11, 2012

(87) PCT Pub. No.: WO2011/145921
PCT Pub. Date: Nov. 24, 2011

(65) Prior Publication Data
US 2013/0055676 A1    Mar. 7, 2013

(51) Int. Cl.
| E04C 3/00 | (2006.01) |
| F16B 37/04 | (2006.01) |
| E04C 3/07 | (2006.01) |
| E04C 3/09 | (2006.01) |
| E04C 3/04 | (2006.01) |

(52) U.S. Cl.
CPC ............ *E04C 3/09* (2013.01); *E04C 2003/0421* (2013.01); *E04C 2003/0434* (2013.01); *F16B 37/046* (2013.01); *E04C 2003/0417* (2013.01); *E04C 3/07* (2013.01); *E04C 2003/0473* (2013.01); *E04C 2003/0452* (2013.01); *E04C 2003/0413* (2013.01)
USPC ............................... 52/850; 52/650.1; 52/843

(58) Field of Classification Search
USPC ........ 52/831, 848, 849, 850, 851, 650.1, 710, 52/243, 243.1
See application file for complete search history.

(56) References Cited

U.S. PATENT DOCUMENTS

| 2,696,139 A | 7/1954 | Attwood |
| 3,043,408 A | 7/1962 | Attwood |
| (Continued) |

FOREIGN PATENT DOCUMENTS

| AU | 5482090 A | 11/1990 |
| AU | 2009227911 A1 | 12/2009 |
| (Continued) |

OTHER PUBLICATIONS

Machine translation of DE 20 2007 008 611 U1, Date pulled Sep. 22, 2013, p. 1-2.*

(Continued)

*Primary Examiner* — Elizabeth A Plummer
(74) *Attorney, Agent, or Firm* — Troutman Sanders LLP; Ryan A. Schneider; Daniel Sharpe

(57) ABSTRACT

An elongate profile element has a bottom, sidewalls extending from the bottom substantially at right angles and an upper side opposite the bottom. The upper side comprises flanges which extend from the respective sidewalls towards each other and delimit between them a longitudinal slot extending over the length of the profile element. The flanges are bended inwards such that the free end of the flanges is directed towards the bottom and extends in a direction substantially at right angles with the bottom. The bottom is provided with spaced apart oblong recesses, which have longitudinal side edges which are bended inwards such that the free end of said edges extends towards the upper side in a direction substantially at right angles with the bottom.

19 Claims, 2 Drawing Sheets

(56) References Cited

U.S. PATENT DOCUMENTS

| | | | |
|---|---|---|---|
| 4,204,375 A * | 5/1980 | Good | 52/239 |
| 4,488,844 A * | 12/1984 | Baubles | 411/85 |
| 5,118,069 A * | 6/1992 | Muhlethaler | 248/613 |
| 5,157,883 A | 10/1992 | Meyer | |
| 5,527,625 A * | 6/1996 | Bodnar | 428/595 |
| 6,298,623 B1 | 10/2001 | Wendt | |
| 7,743,578 B2 * | 6/2010 | Edmondson | 52/653.1 |
| 7,866,112 B2 * | 1/2011 | Edmondson | 52/650.1 |
| 7,984,601 B2 * | 7/2011 | Bimbaum et al. | 52/846 |
| 8,234,832 B2 * | 8/2012 | Birnbaum et al. | 52/710 |
| 2003/0084637 A1 | 5/2003 | Daudet | |
| 2008/0193253 A1 * | 8/2008 | van Walraven | 411/111 |
| 2008/0295452 A1 * | 12/2008 | Birnbaum et al. | 52/832 |

FOREIGN PATENT DOCUMENTS

| | | |
|---|---|---|
| DE | 1908801 A1 | 9/1970 |
| DE | 29824254 U1 | 9/2000 |
| DE | 202007008611 U1 | 8/2007 |
| EP | 0442243 A1 | 8/1991 |
| WO | 2007008060 A1 | 1/2007 |

OTHER PUBLICATIONS

International Search Report and the Written Opinion dated Feb. 23, 2011 for priority PCT/NL2010/000086.

Office Action in related Chinese Application No. 201080066751.3 dated Jul. 24, 2014.

Office Action in related Russian Application No. 2012152350/03 dated May 13, 2014 and English Translation.

* cited by examiner

PROFILE ELEMENT

CROSS-REFERENCE TO RELATED APPLICATIONS

This application is a United States National Stage Application of International Patent Application Serial No. PCT/NL2010/000086, filed 19 May, 2010, which the entire contents and substance of this application is hereby incorporated by reference.

FIELD OF THE INVENTION

The present invention relates to a metal elongate profile element having a bottom, sidewalls extending from the bottom substantially at right angles and an upper side opposite the bottom, wherein the upper side comprises flanges which extend from the respective sidewalls towards each other and which delimit between them a longitudinal slot extending over the length of the profile element. The flanges are bended inwards such that the free end of the flanges is directed towards the bottom and extends in a direction substantially at right angles with the bottom.

BRIEF SUMMARY OF THE INVENTION

This object is achieved by an elongate profile element having a bottom, sidewalls extending from the bottom substantially at right angles and an upper side opposite the bottom, wherein the upper side comprises flanges which extend from the respective sidewalls towards each other and which delimit between them a longitudinal slot extending over the length of the profile element, wherein the flanges are bended inwards such that the free end of the flanges is directed towards the bottom and extends in a direction substantially at right angles with the bottom, wherein the bottom is provided with spaced apart oblong recesses, wherein the oblong recesses in the bottom have longitudinal side edges which are bended inwards such that the free end of the edges extends towards the upper side in a direction substantially at right angles with the bottom.

The invention also relates to a fastening system comprising in combination an elongate profile element as described above; and a fastening unit to be mounted to the profile element, comprising an oblong anchoring element and a support element that is connected to the anchoring element and extends above the upper side of the anchoring element, which support element can be gripped by hand, and wherein the fastening unit furthermore comprises tensioning means connected to the anchoring means, wherein the oblong anchoring element has an upper side and an underside opposite the upper side, and has a width which is only slightly smaller than the width of the longitudinal slot and a length which is greater than the width of the longitudinal slot, such that in use the anchoring body with its longitudinal axis can be aligned with the longitudinal slot and, with its underside facing the bottom of the profile element, inserted between the flanges into the profile element, after which the anchoring element can be rotated so as to engage the flanges with its upper side, wherein the tensioning means in the mounted state clamp the upper side of the anchoring element against the flanges, and wherein the width of the oblong anchoring element is smaller than the width of the oblong recesses in the bottom and/or the side wall of the profiled element and the length of the oblong anchoring element is greater than the width of the oblong recesses such that in use the anchoring body with its longitudinal axis can be aligned with the longitudinal axis of the oblong recess and, with its underside facing the top side of the profile element or, in case the anchoring element is inserted in a recess in one of the side walls, the opposite side wall, inserted between the longitudinal edges of the oblong recess into the profile element, after which the anchoring element can be rotated so as to engage the longitudinal edges with its upper side, wherein the tensioning means in the mounted state clamp the upper side of the anchoring element against the edges of the oblong recess.

The object is also achieved by an elongate profile element comprising two substantially parallel side walls, which on an upper end are provided with upper flanges which extend from the respective sidewalls towards each other and which delimit between them an upper longitudinal slot extending over the length of the profile element, and which on a lower end opposite the upper end are provided with lower flanges which extend from the respective sidewalls towards each other and which delimit between them a lower longitudinal slot extending over the length of the profile element, wherein the profiled element furthermore has at least one connecting web, which extends between the side walls and is connected thereto, and wherein the flanges are bended inwards such that the free end of the upper flanges is directed towards the lower side and the free end of the lower flanges at the lower end of the side walls is directed towards the upper side and the free ends of the upper and lower flanges extend in a direction substantially parallel to the side walls.

The invention furthermore relates to an elongate profile element having a bottom, sidewalls extending from the bottom substantially at right angles and an upper side opposite the bottom, wherein the upper side comprises flanges which extend from the respective sidewalls towards each other and which delimit between them a longitudinal slot extending over the length of the profile element, wherein the flanges have free ends which are directed towards each other, wherein the bottom is provided with spaced apart oblong recesses, wherein the oblong recesses in the bottom have longitudinal side edges which are bended inwards such that the free end of the edges extends towards the upper side in a direction substantially at right angles with the bottom.

The profile element and the fastening system according to the invention advantageously provide the possibility to use anchoring elements fit for strut rails on both the upper side of the profile element as the bottom of the profile element.

The invention will be elucidated in the following description with reference to the drawings.

DETAILED DESCRIPTION OF PREFERRED EMBODIMENTS

Figure 1:
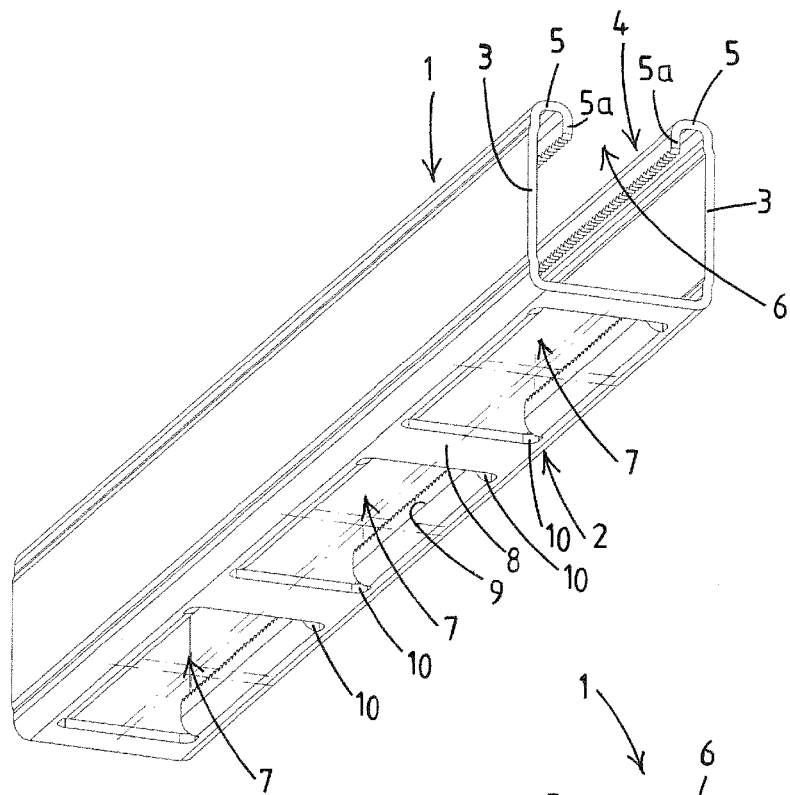
FIG. 1 shows a view in perspective of a profile element according to the invention.

In FIG. 1 is shown a profile element 1 which is made of metal, preferably steel. However, the profile element 1 may also be made from another material, even from for example plastics material. The profile element 1 has a bottom 2, two parallel side walls 3, and an upper side 4. The upper side 4 comprises two flanges 5 which generally extend from the respective side walls 3 towards each other. The flanges 5 are bended inwards such that their free end portions 5a point towards the bottom 2 of the profile element 1. The flanges 5 delimit between them a longitudinal slot 6 with a width Wt.

In the bottom 2 of the profile element 1 is provided a series of oblong recesses 7. The recesses 7 are spaced apart by a bottom portion or connection web 8, which define the front and rear edges of the recesses 7. The recesses 7 furthermore have longitudinal side edges 9 or flanges 9, which are bended inwards such that their free end portions 9a point towards the upper side 4 of the profile element 1. In the embodiment shown the side edges 9 run parallel to the flanges 5.

It is also possible in a not shown embodiment that the side edges run perpendicular to the flanges 5, thus that the longitudinal direction of the recesses 7 in the bottom extends in the transverse direction of the profile element 1. It is also possible that the recesses 7 in the bottom are arranged alternating with their longitudinal direction aligned with the longitudinal direction of the profile element 1 and with their longitudinal direction transverse, preferably at right angles, with respect to the longitudinal direction of the profile element 1.

In another possible embodiment, which is not shown, the recesses 7 may be alternated with other cutouts, such as round or oblong through holes, through which attachment means such as screws can be passed, for example to attach the profile element to a support structure.

Figure 2:
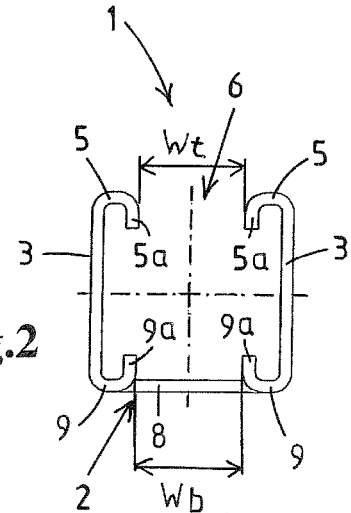
FIG. 2 shows a cross-sectional view of the profile element of FIG. 1.

The side edges 9 of the recesses 7 in the bottom 2 essentially have the same cross sectional shape as the flanges 5 at the upper side of the profile element, as is clearly visible in FIG. 2. The recesses 7 between the flanges 9 have a width Wb, which is preferably more or less the same as the width Wt of the longitudinal slot 6.

The connection webs 8 and the side walls 3 are integrally connected and are made out of one piece. The profile element 1 may be made out of a flat steel blank in which the contours of the inturned edges are punched out. The flat blank is bended into the channel-like shape of the profile element 1 as is shown. The edges 9 are folded inwards to form the longitudinal edges of the recesses 7. The profile element 1 may however also be made by bending a steel blank into the profile and then punch the recesses 7 out with the contours of the inturned edges. Next the edges can be folded into their inturned state.

The connection webs 8 in the embodiment shown have a dimension in the longitudinal direction of the profile element 1, which is at least 25% of the width of the recesses 7 between two connection webs 8. In an example the recesses 7 may have a length 80 mm, a width of about 20 mm and the bridging webs 8 may have a dimension of 20 mm seen in the longitudinal direction.

In a possible embodiment (not shown) the side walls 3 of the profile element 1, can be provided with recesses that are the same as the recesses 7 in the bottom 2 which are described in the above, thus with inturned longitudinal edges. The profile element may have such recesses in one or both of the side walls 3. Also an embodiment is conceivable, in which in the bottom the recesses 7 are omitted and only one or two of the side walls 3 have the recesses.

Figure 3:
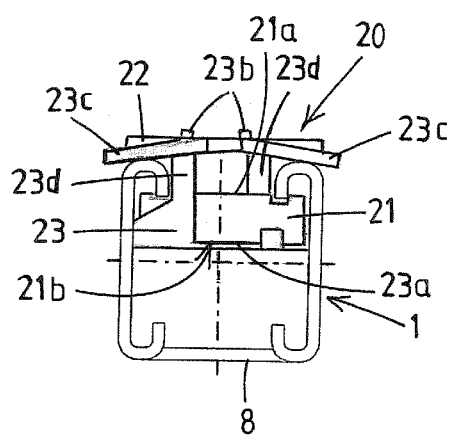
FIG. 3 shows a cross sectional view of a fastening system according to the invention.

In FIG. 3 is shown the profile element, with a fastening unit 20 mounted thereto in a preassembly state. The fastening unit 20 comprises an oblong anchoring element 21. The anchoring element 21 is preferably made of steel and has an underside 21b and an upper side 21a. The anchoring element 21 has a width which is only slightly smaller than the width of the longitudinal slot 6 and the recesses 7 in the profile element 1. The oblong anchoring element 21 has a length which is greater than the width of the longitudinal slot 6 and the recesses 7, such that in use the anchoring element with its longitudinal axis can be aligned with the longitudinal slot 6 or recesses 7 and, with its underside 21b facing the bottom 2 of the profile element 1 or—when inserted in a recess 7—facing the upper side of the profile element 1, inserted between the flanges 5 or 9 into the profile element 1, after which the anchoring element 21 can be rotated around an axis perpendicular to the upper side 4 and the bottom 2 of the profile element 1.

The fastening unit 20 furthermore comprises a metal washer 22 which in the preassembled state is situated a small distance above the flanges 5 of the profile element 1.

The fastening unit also comprises a support element 23 which is made of plastics material. The support element 23 carries the oblong anchoring element 21 and supports it from on the underside 21b with a bottom portion 23a. The support element 23 furthermore has a head portion which is situated above the bottom portion and which is coupled to the washer 22 by means of studs 23b extending through holes in the washer 22. The head portion is connected to the bottom portion 23a by means of legs 23d.

The head portion of the support element 23 furthermore comprises a pair of generally half-ring shaped spring members 23c which extend from the level of the washer 22 in an inclined fashion downwards as can be seen in FIG. 3. The spring members 23c engage the upper side of the flanges 5 in the pre-assembly state shown in FIG. 3. The resiliency of the spring members 23c pulls the bottom portion 23c with the anchoring member 21 upwardly such that the upper side 21a of the anchoring member 21 is into engagement with the end portions 5a of the flanges 5.

A fastening unit 20 can also be mounted at a recess 7 in the bottom 2, or when present in the side walls 3, of the profile element 1. The oblong anchoring element 21 has preferably a length which is smaller than the length of the recess 7. The fastening unit then cooperates with the flanges 9 instead of the flanges 5 as is described in the above.

The anchoring element 21 preferably has a threaded hole (not shown) in it in which a bolt or a threaded rod can be screwed. The washer 22 has a central hole, through which the bolt or rod extends. When the bolt is tensioned or a nut is screwed from above on the threaded rod, the washer 22 is tensioned from the preassembly state into engagement with the upper side of the flanges 5 or 9.

Figure 4:
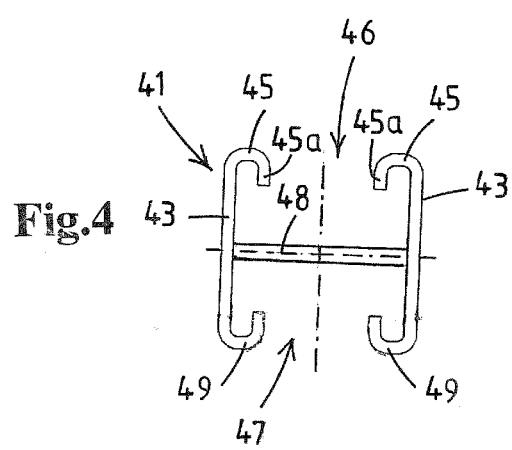
FIG. 4 shows an alternative embodiment of a profile element according to the invention.

In FIG. 4 is shown an alternative embodiment of a profile element according to the invention. In this embodiment the profile element is indicated with reference numeral 41. The profile element 41 has two sidewalls 43 and has upper flanges 45 and lower flanges 49 which correspond to the flanges 5 as have been described in the above for the profile element 1. The upper flanges 45 delimit an upper longitudinal slot 46, the lower flanges 49 delimit a lower longitudinal slot 47. The side walls 43 are interconnected by a connection web 48. The connection web 48 is connected to the respective side walls 43 in the middle of the height of the side walls 43 as is clearly visible in FIG. 4. The connection web 48 extends preferably over the entire length of the profile element 41, but there may also be a plurality of consecutive webs 48 which are spaced apart in the longitudinal direction of the profile element 41.

Figure 5:
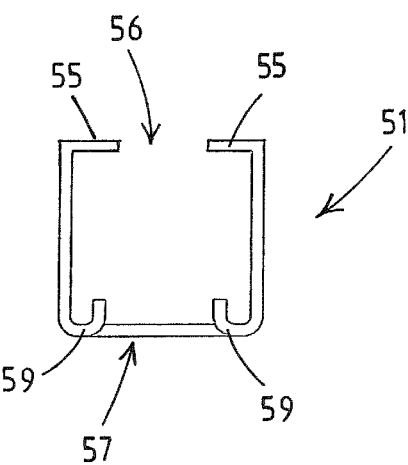
FIG. 5 shows a cross-sectional view of another possible profile element according to the invention.
Figure 6:
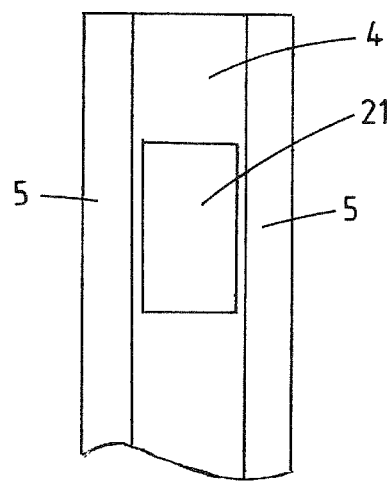
FIG. 6 shows the oblong anchoring element having a width that is smaller than the width of the slot according to the invention.

Another embodiment is conceivable, which is shown in a cross sectional view in FIG. 5 in which the profile element 51 has upper flanges 55 which are not inturned, but are substantially perpendicular to the side walls 53. The flanges 55 define a longitudinal slot 56 in between them. In the bottom are provided recesses 57 with inturned longitudinal edges or flanges 59, which are corresponding to the recesses 7 with the flanges 9 as described in relation to FIGS. 1 and 2. In this embodiment the upper side of the profile element 51 is suitable for other attachment units than the bottom side of the profile element 51.

It is noted that all the inturned flanges in the above described embodiments of the profile element may be provided with teeth, which inhibits an attachment unit to slide in longitudinal direction when it is fixed to the profile element.

The invention claimed is:

1. An elongate profile element comprising:
   a bottom;
   sidewalls extending from the bottom; and
   an upper side opposite the bottom;
   wherein the upper side comprises upper flanges that extend from respective sidewalls towards each other and that delimit between the upper flanges an upper side longitudinal slot extending over the length of the profile element, each upper flange having an upper flange inwardly bent end portion terminating in an upper flange edge facing the bottom;
   wherein the bottom is provided with at least two bottom slots each having a longitudinal axis that is parallel to the upper side longitudinal slot, each at least two bottom slots having bottom longitudinal sides, each bottom longitudinal side defined by a bottom flange extending from the bottom longitudinal side, each bottom flange having a bottom flange inwardly bent end portion terminating in a bottom flange edge facing the upper side, each at least two bottom slots being spaced apart from an adjacent bottom slot by a connection web defining straight transverse edges of the at least two bottom slots;
   wherein the upper side longitudinal slot and the at least two bottom slots have the same width; and
   wherein the distance between the sidewalls extending from the bottom exceeds the width of the longitudinal slot and the at least two bottom slots.

2. The profile element according to claim 1, wherein the upper flanges have the same cross sectional shape as the bottom flanges.

3. The profile element according to claim 1, wherein at least one connection web has a length, defined as the dimension in the longitudinal direction of the profile element, that is at least 25% of the length of a shortest bottom slot, the length of a bottom slot defined as the dimension in the longitudinal direction of the profile element.

4. The profile element according to claim 3, wherein each at least two bottom slots has the same length, so that the length of the shortest bottom slot is the length of any bottom slot.

5. The profile element according to claim 3, wherein at least one bottom slot has a length of 80 mm and a width of 20 mm, and at least one connection web has a length of 20 mm.

6. The profile element according to claim 1, wherein each connection web has a uniform length along a width of the connection web corresponding to the width of the upper side longitudinal slot and the at least two bottom slots.

7. The elongate profile element of claim 1, wherein the sidewalls extend from the bottom at right angles.

8. The elongate profile element of claim 1, wherein each upper flange extends from the respective sidewall at a right angle.

9. The elongate profile element of claim 1, wherein the each upper flange inwardly bent end portion is parallel to a sidewall extending from the bottom.

10. The elongate profile element of claim 1, wherein each bottom flange extends from the respective bottom longitudinal side at a right angle.

11. The elongate profile element of claim 1, wherein the bottom flange inwardly bent end portion is parallel to a sidewall extending from the bottom.

12. The elongate profile element of claim 1, wherein the sidewalls extend from the bottom at right angles;
   wherein each upper flange extends from the respective sidewall at a right angle;
   wherein the each upper flange inwardly bent end portion is parallel to a sidewall extending from the bottom;
   wherein each bottom flange extends from the respective bottom longitudinal side at a right angle; and
   wherein the bottom flange inwardly bent end portion is parallel to a sidewall extending from the bottom.

13. A fastening system comprising:
   the elongate profile element of claim 1, wherein the elongate profile element is made in one piece out of a flat steel blank into a generally channel shape; and
   a fastening unit mountable to the elongate profile element, the fastening unit comprising:
      an oblong anchoring element having an anchoring body and a longitudinal axis;
      a support element; and
      a spring member;
      wherein the support element is connected to the oblong anchoring element and extends above an upper side of the oblong anchoring element, the support element capable of being gripped by hand, and wherein the spring member is connected to the oblong anchoring element; and
      wherein the oblong anchoring element has the upper side, an underside opposite the upper side, a width that is smaller than the width of the elongate profile element longitudinal slot and bottom slots, respectively, and a length that is greater than the width of the elongate profile element longitudinal slot and bottom slots, respectively, such that in use, the anchoring body with its longitudinal axis can be aligned with the longitudinal axes of the longitudinal slot and bottom slots and, with its underside facing the elongate profile element, inserted between flanges of the elongate profile element, after which the anchoring element can be rotated so as to engage the edge of the flanges of the elongate profile element.

14. The fastening system of claim 13, wherein when the underside of the oblong anchoring element faces the upper side of the elongate profile element, the anchoring element can be inserted between the upper flanges of elongate profile element, after which the anchoring element can be rotated so as to engage the upper flange edges of the upper flanges of the elongate profile element.

15. The fastening system of claim 13, wherein when the underside of the oblong anchoring element faces the bottom of the elongate profile element, the anchoring element can be inserted between the bottom flanges of elongate profile element, after which the anchoring element can be rotated so as to engage the bottom flange edges of the bottom flanges of the elongate profile element.

16. The fastening system of claim 13, wherein when the fastening unit is mounted in the elongate profile element, the spring member maintains the mounting relationship via tension between the fastening unit and the elongate profile element.

17. An elongate profile element made in one piece out of a flat steel blank into a generally channel shape having a bottom, sidewalls extending from the bottom substantially at right angles and an upper side opposite the bottom;

the upper side comprising upper flanges that extend from the respective sidewalls towards each other and that delimit between them a longitudinal slot extending over the length of the profile element, the upper flanges having upper flange inwardly bent end portions extending generally parallel to the sidewalls towards the bottom such that edges of the respective upper flanges face the bottom;

the bottom being provided with a series of bottom slots having a longitudinal axis that is parallel to the longitudinal slot in the upper side, the bottom slots having bottom longitudinal sides defined by bottom flanges that extend from the respective bottom longitudinal sides towards each other, the bottom flanges having bottom flange inwardly bent end portions extending generally parallel to the sidewalls towards the upper side such that edges of the respective bottom flanges face the upper side, the bottom slots being spaced apart by bottom portions defining straight transverse edges of the bottom slots;

wherein the longitudinal slot of the upper side and the bottom slots have the same width; and wherein the distance between the sidewalls exceeds the width of the longitudinal slot and bottom slots.

18. The profile element according to claim 17, wherein the upper flanges have the same cross sectional shape as the bottom flanges.

19. The profile element according to claim 17, wherein each bottom portion has a dimension in the longitudinal direction of the profile element that is at least 25% of the width of the bottom slot between adjacent bottom portions.

* * * * *